(12) United States Patent
Belagodu et al.

(10) Patent No.: US 9,866,446 B2
(45) Date of Patent: Jan. 9, 2018

(54) DATA RETRIEVAL SYSTEM

(71) Applicants: Akarsh Belagodu, Atlanta, GA (US); Naveen Dittakavi, Alparetta, GA (US); Vivek Ganti, Atlanta, GA (US)

(72) Inventors: Akarsh Belagodu, Atlanta, GA (US); Naveen Dittakavi, Alparetta, GA (US); Vivek Ganti, Atlanta, GA (US)

(*) Notice: Subject to any disclaimer, the term of this patent is extended or adjusted under 35 U.S.C. 154(b) by 687 days.

(21) Appl. No.: 14/010,477

(22) Filed: Aug. 26, 2013

(65) Prior Publication Data

US 2015/0058340 A1   Feb. 26, 2015

(51) Int. Cl.
*G06F 17/30* (2006.01)
*H04L 12/24* (2006.01)
*G06Q 10/10* (2012.01)
*H04L 29/06* (2006.01)

(52) U.S. Cl.
CPC ............ *H04L 41/22* (2013.01); *G06Q 10/10* (2013.01); *H04L 65/1069* (2013.01); *H04L 65/4007* (2013.01)

(58) Field of Classification Search
CPC ..... G06F 17/30; H04L 65/4007; H04L 29/06; H04L 65/1069; H04M 1/274
USPC ........ 707/705, 721, 736, 769, 770; 709/206, 709/217
See application file for complete search history.

(56) References Cited

U.S. PATENT DOCUMENTS

| | | | |
|---|---|---|---|
| 5,345,571 A * | 9/1994 | Morisada .............. | G06F 9/3844 711/E12.068 |
| 7,054,868 B2 * | 5/2006 | Roemke .............. | G06F 17/3089 |
| 7,457,844 B2 * | 11/2008 | Miller .................. | G06Q 10/107 707/999.1 |
| 7,599,928 B2 * | 10/2009 | Smyth ............... | G06F 17/30864 |
| 7,921,164 B2 * | 4/2011 | Bohle .................... | G06Q 10/10 709/206 |
| 8,117,386 B2 * | 2/2012 | Fujita .................. | G06F 11/3409 709/224 |
| 8,209,308 B2 * | 6/2012 | Rueben ............... | G06F 17/2288 707/705 |
| 8,479,071 B2 * | 7/2013 | Takaku ................. | G06F 11/106 714/746 |
| 8,600,365 B2 * | 12/2013 | Kim .................... | H04M 1/2745 455/418 |

(Continued)

FOREIGN PATENT DOCUMENTS

| | | | | |
|---|---|---|---|---|
| EP | 1083492 A2 * | 3/2001 | ........... | G06F 17/243 |
| WO | WO 2006138176 A1 * | 12/2006 | ............. | G06F 17/30 |

*Primary Examiner* — Frantz Coby

(57) ABSTRACT

Disclosed are various embodiments for a data retrieval system comprising code that accesses a data retrieval platform according to a customer identifier, the customer identifier linked to a plurality of asset identifiers, and code that access a recent correspondence history of an asset identifier of the plurality identifiers. The data retrieval system further comprises code that compares the recent correspondence history to a previous correspondence history of the asset identifier, and code that identifies a recent correspondence associated with the asset identifier in response to a difference between the recent correspondence history and the previous correspondence history. Additionally, the data retrieval system comprises code that encodes a user interface for display to a client associated with the customer identifier, the user interface comprising a portal for retrieving the recent correspondence.

17 Claims, 5 Drawing Sheets

(56) References Cited

U.S. PATENT DOCUMENTS

| | | | |
|---|---|---|---|
| 8,756,523 B2* | 6/2014 | Chiba | G06F 3/0481 715/738 |
| 8,826,347 B1* | 9/2014 | Earle | 725/91 |
| 9,176,485 B2* | 11/2015 | Krumm | G05B 15/02 |
| 9,262,646 B1* | 2/2016 | Yeo | G06F 21/6227 |
| 2001/0028603 A1* | 10/2001 | Shimazu | G06F 17/30389 368/10 |
| 2002/0004778 A1* | 1/2002 | Torii | G06Q 40/02 705/38 |
| 2003/0195764 A1* | 10/2003 | Baker | G06Q 10/10 705/1.1 |
| 2004/0100505 A1* | 5/2004 | Cazier | G06F 3/0482 715/811 |
| 2004/0260979 A1* | 12/2004 | Kumai | G06Q 10/10 714/37 |
| 2005/0130631 A1* | 6/2005 | Maguire et al. | 455/414.1 |
| 2005/0182824 A1* | 8/2005 | Cotte | 709/217 |
| 2007/0061259 A1* | 3/2007 | Zoldi | G06Q 20/04 705/44 |
| 2007/0088788 A1* | 4/2007 | Goldberg et al. | 709/206 |
| 2007/0294084 A1* | 12/2007 | Cross et al. | 704/251 |
| 2008/0091653 A1* | 4/2008 | Jamison et al. | 707/3 |
| 2008/0262961 A1* | 10/2008 | Dellomo | G06Q 40/00 705/38 |
| 2009/0106305 A1* | 4/2009 | Murakami | G06F 17/30011 |
| 2009/0204496 A1* | 8/2009 | Otto | G06N 3/12 705/14.69 |
| 2010/0138323 A1* | 6/2010 | Gowda et al. | 705/30 |
| 2010/0229123 A1* | 9/2010 | Lloyd | G06Q 30/0241 715/826 |
| 2011/0016164 A1* | 1/2011 | Maeshima | G06F 17/3028 707/813 |
| 2011/0060733 A1* | 3/2011 | Peng | G06F 17/30867 707/723 |
| 2013/0096968 A1* | 4/2013 | Van Pelt | G06Q 10/06398 705/7.13 |
| 2013/0144638 A1* | 6/2013 | O'Connor | G06F 19/328 705/2 |
| 2013/0346110 A1* | 12/2013 | Hiramatsu | 705/3 |
| 2014/0074675 A1* | 3/2014 | Calman | G06Q 40/12 705/35 |

* cited by examiner

DATA RETRIEVAL SYSTEM

BACKGROUND

Individuals may wish to apply to various programs, or apply for benefits through an application process. An application process may require significant correspondence between the individual (or a representative of the individual) and the agency responsible for implementing the application process. These correspondences may include paper documents that are mailed between the agency and an individual. The agency may also use an online electronic system to streamline the application process.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to providing a portal that allows users to manage and track the progress of an application process. An application process may entail a user or a representative of the user applying to a program or benefit that is managed by an agency. The agency may use an online application process to allow individuals to apply for the program or benefit. The online application process may include a data retrieval platform that allows individuals to access information about their application such as, status reports, correspondences relating to the application process, notifications relating to the application process, etc. In the following discussion, a general description of the system and its components is provided, followed by a discussion of the operation of the same.

Figure 1:
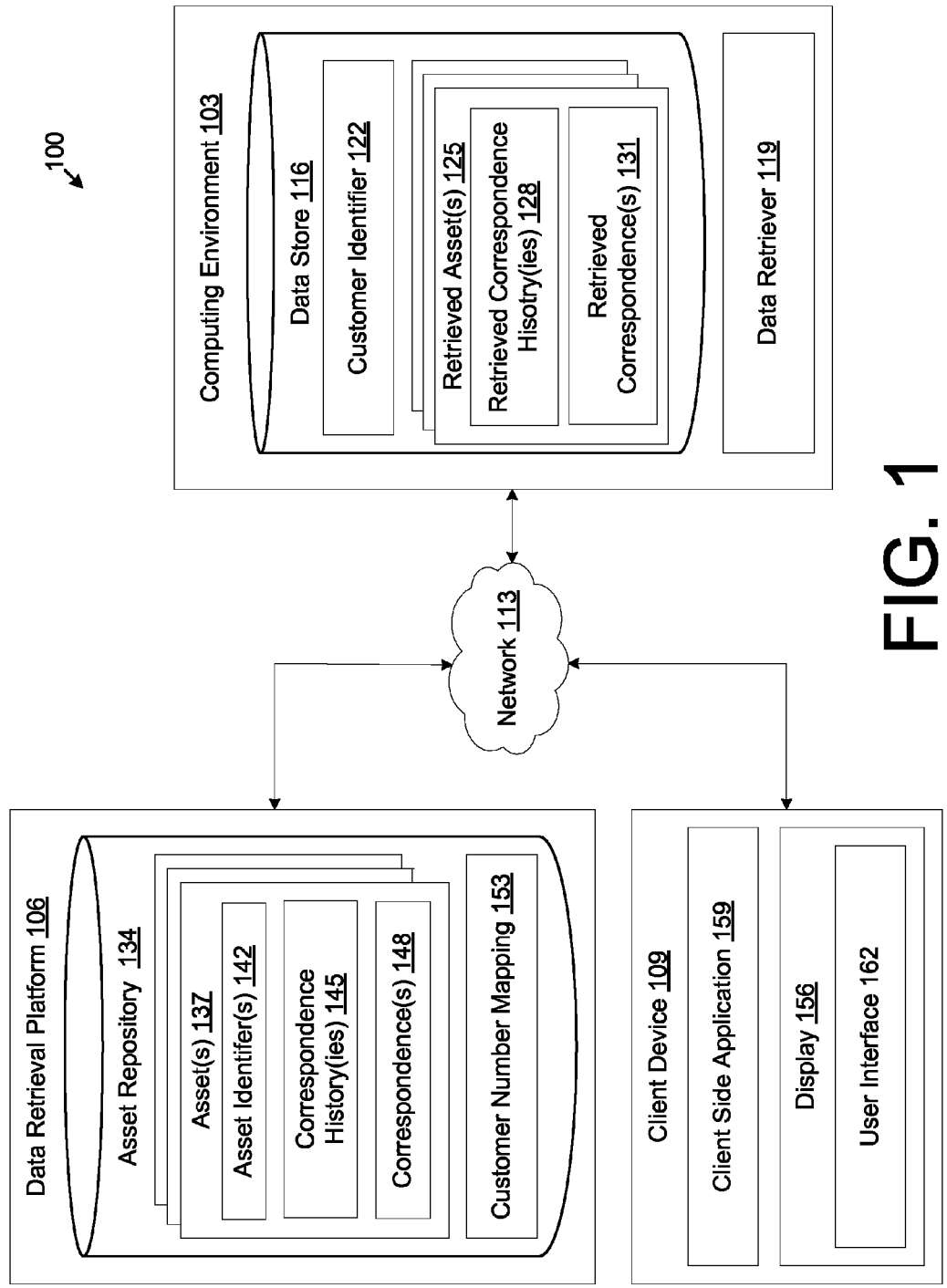
FIG. 1 is a drawing of a networked environment according to various embodiments of the present disclosure.

With reference to FIG. 1, shown is a networked environment 100 according to various embodiments. The networked environment 100 includes a computing environment 103, a data retrieval platform 106, and a client device 109, which are in data communication with each other via a network 113. The network 113 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 116 that is accessible to the computing environment 103. The data store 116 may be representative of a plurality of data stores 116 as can be appreciated. The data stored in the data store 116 for example, is associated with the operation of the various applications and/or functional entities described below.

The components executed on the computing environment 103, for example, include a data retriever 119, and other applications, services, processes, systems, engines, or functionality not discussed in detail herein. The data retriever 119 is executed to access the data retrieval platform 106 and extract data from the data retrieval platform 106. The data retriever 119 generates network content and encodes it for display at a client 109. The data stored in the data store 116 includes, for example, a customer identifier 122, retrieved assets 125, and potentially other data. The customer identifier 122 may be obtained from a client 109 and stored in the data store 116 for subsequent use. A retrieved asset 125 is a copy of an asset retrieved from the data retrieval platform. A retrieved asset 125 may include one or more retrieved correspondence histories 128, and one or more retrieved correspondences 131.

The data retrieval platform 106 may comprise, for example, a server computer or any other system providing computing capability. Alternatively, the data retrieval platform 106 may employ a plurality of computing devices that may be arranged, for example, in one or more server banks or computer banks or other arrangements. Such computing devices may be located in a single installation or may be distributed among many different geographical locations. For example, the data retrieval platform 106 may include a plurality of computing devices that together may comprise a hosted computing resource, a grid computing resource and/or any other distributed computing arrangement. In some cases, the data retrieval platform 106 may correspond to an elastic computing resource where the allotted capacity of processing, network, storage, or other computing-related resources may vary over time.

Various applications and/or other functionality may be executed in the data retrieval platform 106 according to various embodiments. Also, various data is stored in an asset repository 134 that is accessible to the data retrieval platform 106. The asset repository 134 may be representative of a plurality of data stores or repositories as can be appreciated. The data stored in the asset repository 134 for example, is associated with the operation of the various applications and/or functional entities described below.

The components executed on the data retrieval platform 106, for include applications, services, processes, systems, engines, or other functionality. The data retrieval platform 106 may include applications that request credentials, security information, or authentication information to grant access to the asset repository 134.

The data stored in the asset repository 134 includes, for example, assets 137, a customer identifier mapping 142, and potentially other data. An asset 137 is a virtual representation of an asset such as a digital right, a legal right, a permission, an agreement, a contract, or any other intangible asset that has intrinsic value. Users apply to obtains an asset 137 through an application process. The application process is administered by a public or private agency that may approve or deny a user's application to obtain an asset 137. The asset 137 is associated with an asset identifier 142, a correspondence history 145, one or more correspondences 148, or any other information relating to the asset 137. The asset identifier 142 may be a number or name used to track the status of the asset through the application process. The correspondence history 145 is a list of correspondences 148 associated with the application process of a particular asset 137. The correspondence history 145 may itemize the correspondences 145 and include a timestamp or data associated with a respective correspondence 148. A correspondence 145 may be a notification message, status message, a form, or any other correspondence 145 relating to the application for an asset 137. The customer identifier mapping 153 links a customer identifier 122 to one or more asset identifiers 142. In this respect, a user having a particular customer identifier 142 may be associated with multiple assets 137 for which the user is applying.

The client 109 is representative of a plurality of client devices that may be coupled to the network 113. The client 109 may comprise, for example, a processor-based system such as a computer system. Such a computer system may be embodied in the form of a desktop computer, a laptop computer, personal digital assistants, cellular telephones, smartphones, web pads, tablet computer systems, or other devices with like capability. The client 109 may include a display 156. The display 156 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 109 may be configured to execute various applications such as a client application 159 and/or other applications. The client application 159 may be executed in a client 109, for example, to access network content provided by the computing environment 103 and/or other servers, thereby rendering a user interface 162 on the display 156. To this end, the client application 159 may comprise, for example, a browser, a dedicated application, etc., and the user interface 162 may comprise a network page, an application window, etc. The client 109 may be configured to execute applications beyond the client application 109 such as, for example, email applications, social networking applications, word processors, spreadsheets, and/or other applications.

Next, a general description of the operation of the various components of the networked environment 100 is provided. To begin, a user applies to obtain ownership or authority for an asset 137. While the application process may be performed, at least in part, by corresponding via paper mail, fax, or phone, some portions of the application process may use a data retrieval platform 106. The data retrieval platform 106 generates, manages, and maintains various correspondences 148 exchanges between an agency and a user who is applying for the asset 137. As correspondences 148 are issued by the agency to the user or transmitted from the user to the agency, electronic copies of the correspondences 148 are stored in the asset repository 134. Additionally, the correspondence history 145 is updated for each additional correspondence 145.

A user may obtain updates regarding new correspondences 148 by using the services of the data retriever 119. The data retriever 119 may generate a portal that is encoded for display at the client 106. The portal allows the user to submit a customer identifier 122 to the computing environment 103 that is responsible for executing the data retriever 119. For example, the data retriever 119 provides an online form to obtain the customer identifier 122 and stored the obtained customer identifier 122 in a data store 116.

The data retriever 119 uses the customer identifier 122 to access at least a portion of the asset identifiers 142. The data retriever 119 may access the data retrieval platform 106 via a data transfer protocol and/or an application program interface. The data retriever 119 may submit the customer identifier 122 to the data retrieval platform 106 to determine at least a portion of the asset identifiers 142 associated with the customer identifier 122. For example, the data retrieval platform 106 uses a customer identifier mapping 153 to determine those asset identifiers 142 associated with the submitted customer identifier 122. The data retrieval platform 106 may return a listing of at least a portion of the asset identifiers 142 to the data retriever 119. The listing of asset identifiers 142 may be formatted as an HTML (hypertext markup language) document. Based on the listing of asset identifiers 142, the data retriever 119 may iteratively access each asset 137 specified in the listing of asset identifiers 142.

For a given asset 137, the data retriever 119 may request to access the a correspondence history 145. Thereafter, the data retriever 119 retrieves and store the correspondence history 145 as a retrieved correspondence history 128. The data retriever 119 access the correspondence history 145 according to a schedule to compare a recently retrieved correspondence history 128 to a previously retrieved correspondence history 128. If a difference exists based on the comparison, the data retriever 119 determines that a recent correspondence associated with the asset 137 has occurred. The data retriever 119 identifies information relating to the recent correspondence 148 such as, for example, a title or name of the correspondence, a timestamp or correspondence date of the correspondence 148, or any other information. Based on this information, the data retriever 119 accesses the correspondence 148 and stores the correspondence 148 as a retrieved correspondence 131. The data retriever 119 may perform the operations discussed above for each asset identifier 137 specified in the listing of the asset identifiers 142.

The data retriever 119 may generate network content for a portal that is presented to a user associated with the customer identifier 122. The network content may include text that represents one or more retrieved correspondences 131. The network content may include a link to facilitate a downloading of the retrieved correspondence 131. In addition, the network content may include information relating to the retrieved correspondence 131. A user may log into the portal to access the retrieved correspondence 131.

Figure 2:
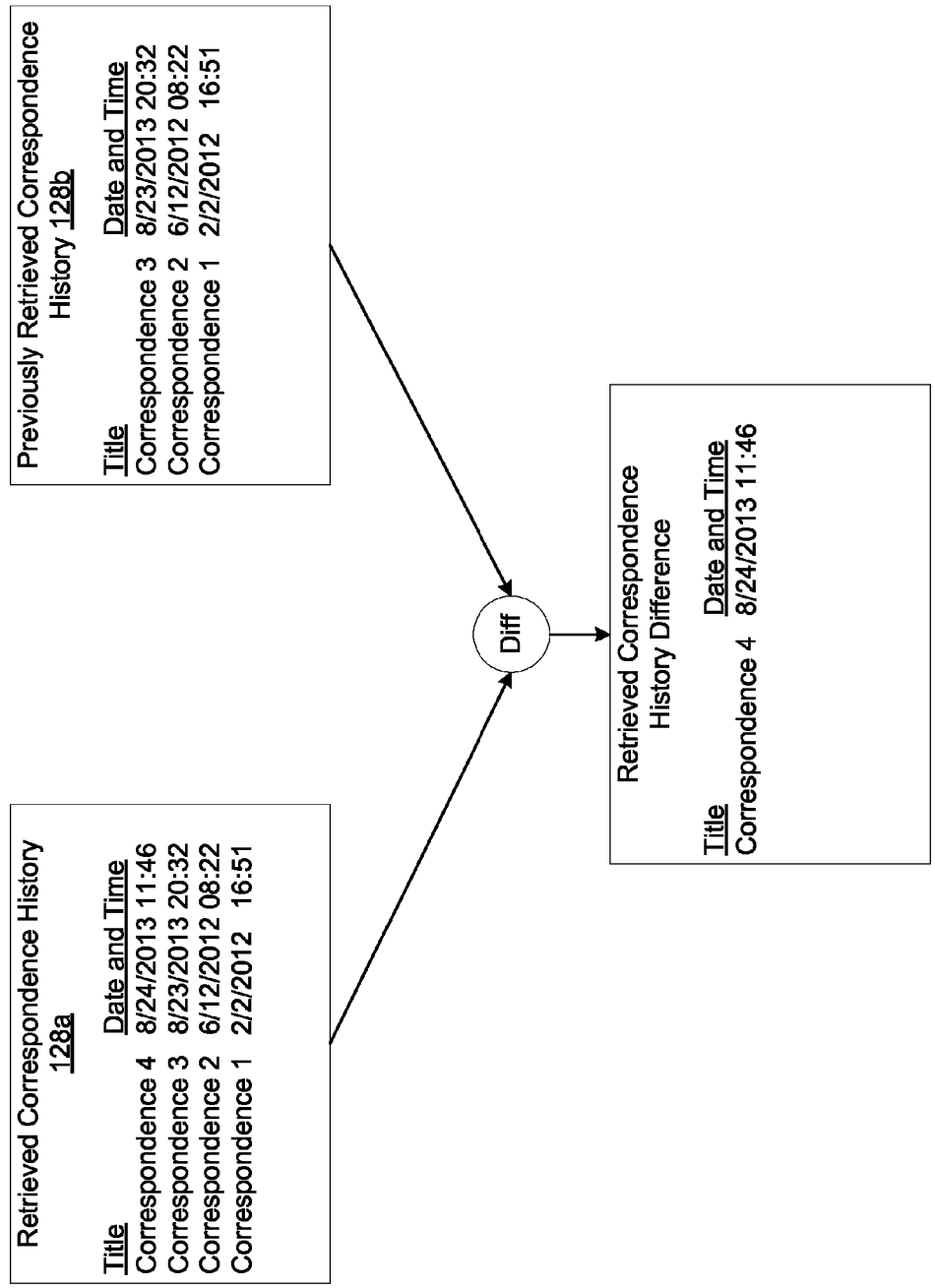
FIG. 2 is an example of a recently retrieved correspondence history 128a and a previously retrieved correspondence history 128b stored in the networked environment 100 of FIG. 1 according to various embodiments of the present disclosure.

Referring next to FIG. 2, shown is a recently retrieved correspondence history 128a and a previously retrieved correspondence history 128b stored in the networked environment 100 of FIG. 1. The data retriever 119 may periodically access a correspondence history 145 (FIG. 1) of a particular asset 137 (FIG. 1). The data retriever 119 may store versions of the correspondence history 145 as various retrieved correspondence histories 128a and 128b. If a changes occurs in the correspondence history 145, then that change is determined in response to comparing the recently retrieved correspondence history 128a with the previously retrieved correspondence history 128b. As shown in the non-limiting example of FIG. 2, the data retriever 119 determines that a difference exists between the recently retrieved correspondence history 128a with the previously retrieved correspondence history 128b. In this example, the data retriever 119 determines that "correspondence 4" is a recent correspondence 145 (FIG. 1) associated with the application of a particular asset 137. Moreover, the data retriever 119 determines information about the recent correspondence 148 such as date and time information.

In response to determining the recent correspondence 148, the data retriever 119 may access the recent correspondence 148 stored in the asset repository 134 (FIG. 1) and store it as a retrieved correspondence 131.

Figure 3:
FIG. 3 is an example of a user interface rendered by a client in the networked environment 100 of FIG. 1 according to various embodiments of the present disclosure.

Turning now to FIG. 3, shown is a user interface 162 rendered by a 106 (FIG. 1) client in the networked environment 100 of FIG. 1. The data retriever 119 (FIG. 1) generate network content and encodes the network content for display at the client 106. The encoded network content may comprise, for example, an HTML document. The client 106 may render the encoded network content as a user interface 162. The user interface may be a portal that allows users to log in with security information/credentials to display information relating to the application process of one or more assets 137 (FIG. 1).

The user interface 162 may include one or more retrieved correspondences 131. Moreover, the user interface 162 may display many recent correspondences 131 for various assets 137 that are associated with the customer identifier 122 (FIG. 1) of the user. Recent correspondences 131 are determined using the operations discussed with respect to at least FIG. 2.

In various embodiments, the user interface 162 includes check boxes or any other form object that is associated with a respective retrieved correspondence 131. The form object may be used by the user to track whether the user has handled the retrieved correspondence 131. To this end, the form object may be used as a checklist to allow users to facilitate an intake of each recent correspondence 145 (FIG. 1) that is retrieved by the data retriever 119.

The user interface 162 may also display a listing of all the retrieved correspondences 131 for a given period of time. For example, the user interface 162 may list the ten most recent retrieved correspondences 131. Additionally, the user interface 162 may include a filter field for receiving a filter input to filter the retrieved correspondences 131 according to a filter, such as time, date, title, and/or other filters. Interacting with the form object may cause the user interface to move an "unchecked" object to another portion of the user interface 162, remove the object completely from the user interface 162, and/or otherwise manipulate the object's depiction on the user interface 162.

Each line item in the user interface 162 may represent a corresponding retrieved correspondence 131. Moreover, a download object may be provided for each retrieved correspondence 131 to allow a user to download a retrieved correspondence 131.

Figure 4:
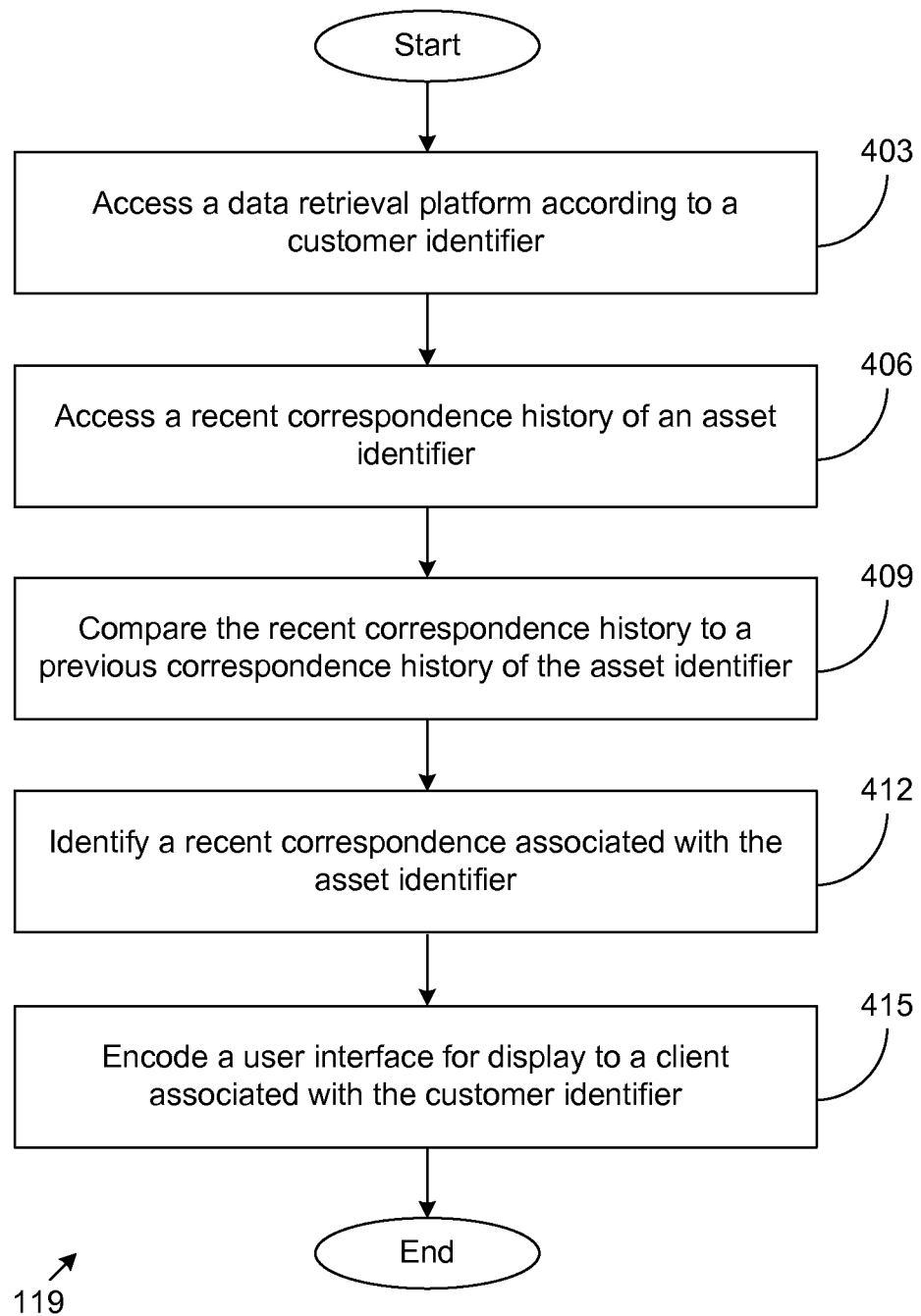
FIG. 4 is a flowchart illustrating one example of functionality implemented as portions of data retriever executed in a computing environment in the networked environment of FIG. 1 according to various embodiments of the present disclosure.

Referring next to FIG. 4, shown is a flowchart that provides one example of the operation of a portion of the data retriever 119 according to various embodiments. It is understood that the flowchart of FIG. 4 provides merely an example of the many different types of functional arrangements that may be employed to implement the operation of the portion of the data retriever 119 as described herein. As an alternative, the flowchart of FIG. 4 may be viewed as depicting an example of elements of a method implemented in the computing environment 103 (FIG. 1) according to one or more embodiments.

Beginning at 403, the data retriever 119 accesses a data retrieval platform 106 (FIG. 1) according to a customer identifier 122 (FIG. 1). The data retriever 119 may access the data retrieval platform 106 using, for example, a URL. The data retriever 119 may obtain a customer identifier 122 from a user. The user may submit the customer identifier 122 to the data retriever 119 by way of an online form. Upon obtaining the customer identifier 122, the data retriever 119 may store the customer identifier 122 in a data store 116 (FIG. 1) for subsequent access. The customer identifier 122 is linked to a plurality of asset identifiers 142 (FIG. 1). An asset identifier 142 may be, for example, a number associated with an asset 137 (FIG. 1) for which the user or the user's representative is applying. The data retriever 119 may submit the customer identifier 122 to the data retrieval platform 106 to access the data retrieval platform 106.

At 406, the data retriever 119 accesses a recent correspondence history 145 (FIG. 1) of an asset identifier 142. The data retriever 119 may determine an asset identifier 142 in response to accessing the data retrieval platform 106 using the customer identifier 122. For example, the data retrieval platform 106 may identify at least a portion of the asset identifiers 142 associated based on a submitted customer identifier 122. The data retriever 119 may store a listing of the asset identifiers 142 in response to accessing the data retrieval platform 106.

The data retriever 119 may retrieve the correspondence history 145 and store the correspondence history 145 as retrieved correspondence history 128 (FIG. 1) in the data store 116. The data retriever 119 may use a file transfer protocol or any other data retrieval protocol to copy information from the data retrieval platform 106.

At 409, the data retriever 119 compares the retrieved recent correspondence history 128a (FIG. 2) to a previously retrieved correspondence history 128b (FIG. 2) of the asset identifier 142. The data retriever 119 may periodically retrieve correspondence history 128 (FIG. 1) as the correspondence history 145 is updated throughout the application process. The data retriever 119 may perform comparisons, such as text string comparisons, to determine differences between the recent retrieved correspondence history 128a that was recently retrieved and the previous correspondence history 128b was was previously stored in the data store 116. For example, the comparison may also involve identifying timestamps included in the correspondence history 145.

At 412, the data retriever 119 identifies a recent correspondence 148 (FIG. 1) associated with the asset identifier 142. The data retriever 119 may determine that a recent correspondence 148 has been generated through the application process. The recent correspondence 148 is ascertained in response to determining a difference between the recently retrieved correspondence history 128a and the previously retrieved correspondence history 128b. The data retriever 119 may retrieve and store the recent correspondence 148 in the data store 116 as a retrieved correspondence 131 (FIG. 1).

At 415, the data retriever encodes a user interface 162 (FIG. 1) for display to a client 109 (FIG. 1) associated with the customer identifier 122. The user interface 162 includes a portal for retrieving the recent correspondence 148. The user interface 162 displays a representation of the recent correspondence 148 to the user. Additionally, the user interface 162 may include a link to access the retrieved recent correspondence 131.

The flowchart of FIG. 4 represents retrieving a recent correspondence 148 for an asset identifier 142. However, the data retriever 119 may iteratively apply portions of the functionally of FIG. 4 to retrieve multiple correspondences 148 from the various asset identifiers 142 associated with the customer identifier 122.

Figure 5:
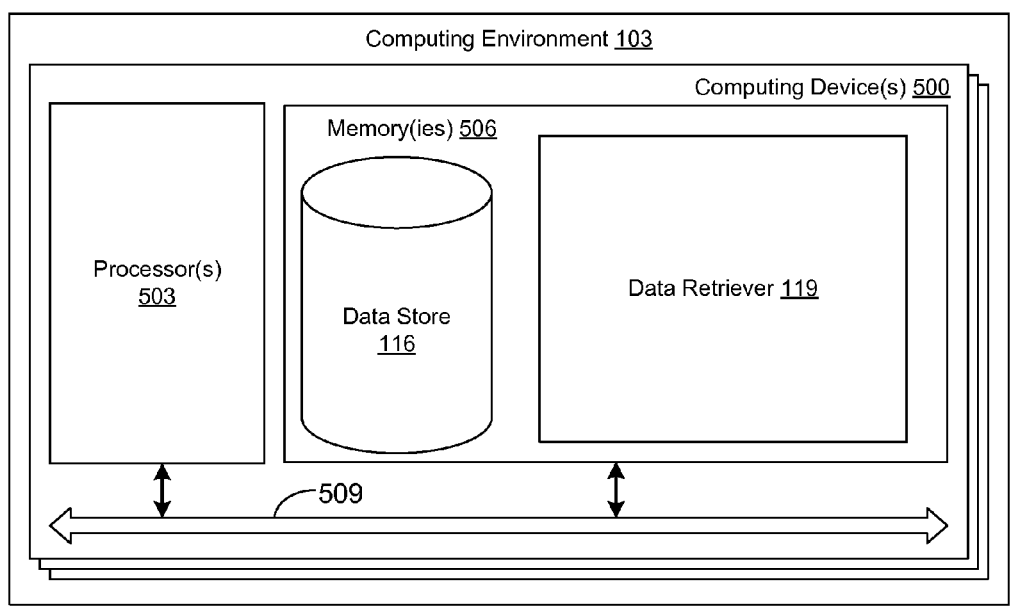
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500 Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are data retriever 119, and potentially other applications. Also stored in the memory 506 may be a data store 116 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although data retriever 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the data retriever 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including data retriever 119, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including data retriever 119, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising: code that accesses a data retrieval platform according to a customer identifier, the customer identifier linked to a plurality of asset identifier, wherein the code that accesses the data retrieval platform comprises code that accesses a private application retrieval platform or a public application retrieval platform; code that accesses a recent correspondence history of an asset identifier of the plurality identifiers, wherein the asset identifier comprises an application number; code that compares the recent correspondence history to a previous correspondence history of the asset identifier; code that identifies a recent correspondence associated with the asset identifier in response to a difference between the recent correspondence history and the previous correspondence history; and code that encodes a user interface for display to a client associated with the customer identifier, the user interface comprising a portal for retrieving the recent correspondence; and code that stores the recent correspondence in a memory accessible to a server, wherein the server provides the portal for retrieving the recent correspondence.

2. The non-transitory computer-readable medium of claim 1, wherein the program further comprises code that stores a listing of the plurality of asset identifiers in response to accessing the data retrieval platform.

3. The non-transitory computer-readable medium of claim 1, wherein the program further comprises code that iteratively accesses a plurality of recent correspondence histories of the plurality of asset identifiers to identify a plurality of recent correspondences.

4. The non-transitory computer-readable medium of claim 3, wherein the portal is configured to present a listing of the plurality of recent correspondences for retrieval of the plurality of recent correspondences.

5. The non-transitory computer-readable medium of claim 3, wherein the plurality of recent correspondences of the plurality of asset identifiers are identified based on a plurality of respective comparisons between the respective recent correspondence histories and a respective previous correspondence histories of the plurality of asset identifiers.

6. A system, comprising: at least one computing device including a processor circuitry; and an application executed in the at least one computing device, the application comprising: logic that encodes a user interface for display to a client, the user interface comprising a portal that obtains a customer identifier, wherein the customer identifier is linked to a plurality of asset identifiers; logic that accesses a data retrieval platform to retrieve a correspondence history of an asset identifier of the plurality of asset identifiers according to the customer identifier, wherein the logic that accesses the data retrieval platform comprises logic that accesses a private application retrieval platform or a public application retrieval platform; logic that accesses the data retrieval platform to retrieve a subsequent correspondence history of the asset identifier, wherein the asset identifier comprises an application number; logic that identifies a recent correspondence associated with the asset identifier in response to a difference between the correspondence history and the subsequence correspondence history; and logic that provides the recent correspondence from the data retrieval platform to the client via the portal; and logic that stores the recent correspondence in a memory accessible to a server, wherein the server provides the portal for retrieving the recent correspondence.

7. The system of claim 6, wherein the recent correspondence is at least one a power of attorney document, a filing receipt, an office action, or a notice of allowance.

8. The system of claim 6, further comprising logic that identifies a plurality of recent correspondences of the plurality of asset identifiers.

9. The system of claim 8, further comprising logic that provides the plurality of recent correspondences to the client via the portal, wherein the recent correspondence is generated by the data retrieval platform.

10. The system of claim 9, wherein the plurality of recent correspondences are configured to be provided in chronological order.

11. The system of claim 8, further comprising logic that filters a portion of the plurality of recent correspondences for display to the client via the portal.

12. A computer implemented method, comprising a processor circuitry configured for: accessing, by a computing device, a data retrieval platform according to a customer identifier, the customer identifier linked to a plurality of asset identifiers, wherein the logic that accesses the data retrieval platform comprises logic that accesses a private application retrieval platform or a public application retrieval platform; performing, by the computing device, a correspondence retrieval operation comprising: accessing, by the computing device, a recent correspondence history of an asset identifier of the plurality identifiers, wherein the asset identifier comprises an application number; comparing, by the computing device, the recent correspondence history to a previous correspondence history of the asset identifier; and identifying, by the computing device, a recent correspondence associated with the asset identifier in response to a difference between the recent correspondence history and the previous correspondence history; and encoding, by the computing device, a user interface for display to a client associated with the customer identifier, the user interface comprising a portal for retrieving the recent correspondence; and storing the recent correspondence in a memory accessible to a server, wherein the server provides the portal for retrieving the recent correspondence.

13. The method of claim 12, further comprising performing, by the computing device, the correspondence retrieval operation for each of the other asset identifiers of the plurality of asset identifiers to obtain a plurality of recent correspondences.

14. The method of claim 13, further comprising ordering, by the computing device, at least a portion of the plurality of recent correspondences according to a filter input.

15. The method of claim 14, wherein the filter input comprises a time range.

16. The method of claim 12, further comprising associating, by the computing device, the recent correspondence with a metadata, the metadata comprising at least one of a status identifier, owner identifier, or a due date identifier.

17. The method of 13, further comprising removing, by the computing device, at least a portion of the plurality of recent correspondences from a listing of the plurality of recent correspondences in response to a request.

* * * * *